United States Patent [19]

Chubb

[11] Patent Number: 4,818,477

[45] Date of Patent: Apr. 4, 1989

[54] PCI RESISTANT FUEL AND METHOD AND APPARATUS FOR CONTROLLING REACTIVITY IN A REACTOR CORE

[75] Inventor: Walston Chubb, Murrysville, Pa.

[73] Assignee: Westinghouse Electric Corp., Pittsburgh, Pa.

[21] Appl. No.: 629,533

[22] Filed: Jul. 10, 1984

[51] Int. Cl.⁴ .................. G21C 3/04; G21C 3/06; G21C 7/04

[52] U.S. Cl. .................. 376/419; 376/328; 376/339; 376/413; 376/414; 376/428; 376/435

[58] Field of Search .............. 376/414, 415, 419, 428, 376/435, 328, 413, 339

[56] References Cited

U.S. PATENT DOCUMENTS

| | | | |
|---|---|---|---|
| 2,951,801 | 9/1960 | Lillie | 376/339 |
| 3,365,367 | 1/1968 | Dolle | 176/22 |
| 3,372,213 | 3/1968 | Nishiyama et al. | 264/0.5 |
| 3,427,222 | 2/1969 | Biancheria et al. | 176/68 |
| 3,510,398 | 5/1970 | Wood | 376/339 |
| 3,759,243 | 9/1973 | Masetti | 176/68 |
| 3,981,598 | 9/1976 | Taulier et al. | 403/28 |
| 3,996,120 | 12/1976 | Freund et al. | 204/157.1 R |
| 4,019,954 | 7/1977 | Giordano et al. | 176/38 |
| 4,131,511 | 12/1978 | Mordarski et al. | 176/68 |
| 4,252,691 | 2/1981 | Lipp et al. | 376/339 |
| 4,293,598 | 10/1981 | Hartman et al. | 376/339 |
| 4,378,329 | 3/1983 | Uchikawa et al. | 376/435 |
| 4,474,728 | 10/1984 | Radford | 376/339 |
| 4,495,140 | 1/1985 | Kochka et al. | 376/207 |
| 4,560,575 | 12/1985 | Eisenstatt et al. | 427/6 |
| 4,566,989 | 1/1986 | Radford et al. | 252/478 |
| 4,574,069 | 3/1986 | Ross et al. | 376/267 |
| 4,576,787 | 3/1986 | Alsop et al. | 376/447 |
| 4,582,676 | 4/1986 | Chubb | 376/414 |
| 4,587,087 | 5/1986 | Radford et al. | 376/414 |
| 4,587,088 | 5/1986 | Radford | 376/419 |

FOREIGN PATENT DOCUMENTS 796989 6/1958 United Kingdom .

OTHER PUBLICATIONS

CRC Handbook of Chemistry and Physics, 1985-86, Edited by Robert C. Weast, Ph.D, pp. B-10, B-234.

Primary Examiner—John F. Terapane
Assistant Examiner—Eric Jorgensen

[57] ABSTRACT

A nuclear fuel assembly comprising a plurality of fuel rods, each fuel rod comprising a cladding tube closed at both ends and filled with cylindrical nuclear fuel pellets such as sintered uranium dioxide or uranium plutonium dioxide. All or nearly all of the cylindrical pellets are coated with a refractory boride coating of sufficient thickness to prevent mechanical interaction between the pellets and the tube. The isotopic composition of the boron in the refractory boride is adjusted for each batch of fuel pellets, rods, or assemblage of rods so that the initial excess reactivity, k, of the batch, when assembled in a reactor core, is nearly zero.

22 Claims, 2 Drawing Sheets

PCI RESISTANT FUEL AND METHOD AND APPARATUS FOR CONTROLLING REACTIVITY IN A REACTOR CORE

BACKGROUND OF THE INVENTION

The present invention relates to a method and apparatus for minimizing the effects of pellet-cladding interaction (PCI) in nuclear fuel rods. The present invention also relates to coated nuclear fuel pellets and more particularly to fuel pellets coated with a burnable poison.

It is known that nuclear fuel may have various shapes such as plates, columns, or fuel rods comprising fuel pellets disposed in end-to-end abutment within a tube or cladding made of a zirconium alloy or stainless steel. Such fuel pellets contain fissionable material, such as uranium dioxide, plutonium dioxide, or mixtures thereof. The fuel rods are usually grouped together to form a fuel assembly. The fuel assemblies are arranged together to constitute the core of a nuclear reactor.

The nuclear fuel pellets in a fuel rod may interact with the tube or cladding in an undesirable manner. Theoretically, the PCI phenomenon may even result in cladding fracture whereby the fuel pellets are exposed to reactor coolant water resulting in the introduction of radioactive fission products into the coolant. One method of controlling PCI is to position cushioning layers of non-fuel material between the fuel and the cladding. Such layers may be attached to either the fuel outside diameter or to the cladding inside diameter. Either is sufficient as long as the layer prevents direct contact between the fuel pellets and the cladding.

U.S. Pat. No. 3,427,222 describes coating of burnable poisons applied to fuel pellets of the above-described configuration. One of the preferred designs of this patent is a coating of pure zirconium diboride ($ZrB_2$) applied to the fuel pellets as a layer of about 5 to 10 microns (0.2 to 0.4 mils) thick although coatings in the range of 0.02 to 5.0 mils are discussed.

However, to achieve the proper separation of the fuel and cladding and to prevent undesirable PCI, a layer of 10 to 100 microns (0.4 to 4 mils) thick is desirable. Such relatively thick layers should be good conductors of heat, such as zirconium diboride, so as not to unduly interfere with heat exchange between the fuel pellets and the coolant.

Unfortunately, if zirconium diboride or other known burnable poisons were added to all of the fuel pellets in a reactor with no regard to the amount of boron-10 (an isotope constituent of natural boron) or other neutron absorbing isotopes present, and in thicknesses of 10 to 100 microns, the reactor core would contain too much poison to operate. In other words, the burnable poisons would more than compensate for the excess reactivity of the core. As used herein, burnable poisons comprise neutron absorbing poisons which burn faster than the nuclear fuel.

A reactor core is typically operated to produce heat which is converted to steam. The steam may then be used to produce electricity or for other purposes. When a new reactor starts, its core is often divided into a plurality, e.g. three, groups of assemblies which may or may not be distinguished by their position in the core but which are usually distinguished by the enrichment of the nuclear fuel in the fuel pellets. For example, a first batch or region may be enriched to an isotopic content of 2.0% uranium-235. A second batch or region may be enriched to 2.5% uranium-235 and a third batch may be enriched to 3.5% uranium-235. After ten to eighteen months of operation, the reactor would typically be shut down and the first batch would be removed from and replaced by a new batch, enriched to about 3.5% uranium-235. Subsequent cycles would repeat this sequence at intervals in the range of from about eight to eleven months. Refueling as described above is required since the reactor operates as a nuclear device to produce heat only as long as it remains a critical mass. In order for a core to remain a critical mass at the end of a given period of operation, it must possess excess reactivity, k, at the beginning of operation.

Power reactors are typically provided with sufficient excess reactivity at the beginning of a cycle to allow operation for a period of about six to eighteen months. Since a reactor operates only slightly supercritical, the excess reactivity supplied at the beginning of a cycle must be counteracted. It is for this reason that various schemes such as partial insertion of control rods or adding neutron absorbing poisons to the core or fuel are used. Combinations of the above-described control methods may be employed to improve the efficiency of control of excess reactivity as evident by U.S. Pat. No. 3,349,152; U.S. Pat. No. 3,372,213, or U.S. Pat. No. 3,427,222; and EPRI Report NP-1974.

The use of control rods to control excess reactivity introduces a disadvantage in that it effectively removes part of the active core. This removes part of the moderator as well and makes the reactor less efficient in its creation and use of neutrons.

The use of neutron absorbing poisons in the coolant is better in terms of efficiency but is limited by other considerations. For example, a boiling water reactor can use practically no water soluble salt with poisons in its coolant since these salts would be left on the fuel rods and interfere with heat transfer and would also accelerate corrosion as the coolant water evaporated to form steam.

The amount of burnable poison used in pressurized water reactor coolant (chemical shim) is limited by the fact that as the reactor heats up, some of the coolant is forced out of the core by thermal expansion. Since the coolant is both a moderator and the poison, the reactivity of the core will not progressively increase as the reactor heats up unless the coolant is more poison than moderator. This condition of progressive increase in reactivity during heat up by forcing soluble poison out of the core with moderator water occurs when the coolant contains more than about 1200 ppm of natural boron in solution.

While boron may be used as chemical shim to counteract excess reactivity for a period of five to six months, for the reasons stated above, it cannot be used as a chemical shim if a longer cycle is desired. Under those circumstances either control rods must be used or some other form of burnable poison supplied.

Incorporation of burnable poison in fuel assemblies has been recognized in the nuclear field as an effective means of increasing fuel capacity and thereby extending core life. Burnable poisons are used either uniformly with the fuel (i.e. distributed poison) or placed discretely on separate elements in the reactor, so arranged that they burn out or are depleted at about the same rate as the fuel. Thus, the net reactivity of the core is maintained relatively constant over the active life of the core. U.S. Pat. No. 3,427,222.

It is known that nuclear fuel contained in an aluminum can may be coated with a layer of niobium to prevent the fuel from reacting with the can (U.K. Pat. No. 859,206). It is also known that minute nuclear fuel particles, such as uranium dioxide particles may be coated with a single layer or several layers of the same or different non-poison materials, including niobium for such purposes as protecting the fuel from corrosion and helping to retain the products of fission. The coating may be applied by various techniques such as depositing from a vapor of the coating material, depositing from a decomposing vapor, and electroplating (U.K. Pat. No. 933,500).

Japanese Pat. No. 52-3999 describes a nuclear fuel which is first coated with a thin layer of material such as niobium to absorb fission fragments and then coated with a main coating material such as zircoloy. This reference is not concerned with burnable poison coatings.

In *Dispersion Fuel Elements*, an AEC monograph by A. N. Holden published in 1967 by Gordon and Breach of New York, there is described coating fuel particles in dispersion fuels to prevent chemical interaction of the particles with the matrix and to retain fission products (page 30). Uranium dioxide coated with niobium by vapor phase reduction is also discussed (page 48). Also discussed is uranium dioxide coated with chromium, by vapor phase reduction using chromium dichloride, which was deposited over a niobium undercoat (page 48).

Accordingly, it will be appreciated that there remains an unsolved need for a fuel assembly design wherein a protective layer is provided between substantially all of the fuel pellets and the cladding in the core and at the same time introducing an appropriate amount of burnable poison into the core to control excess reactivity and enhance operating efficiency.

SUMMARY OF THE INVENTION

It is therefore an object of the present invention to provide a fuel assembly comprising fuel rods containing pellets having a coating operable to reduce PCI. It is a further object of the present invention to provide a fuel assembly comprising fuel rods containing pellets having a coating with sufficient neutron absorbing material to prevent excess reactivity and thick enough to prevent undesirable PCI.

It is a further object of the present invention to produce a fuel rod which is resistant to PCI damage.

It is a still further object of the present invention to produce a fuel assembly which will generate less internal gas pressure per fuel rod during operation than conventional rods having boride coated fuel pellets.

It is yet another object of the present invention to provide a method for controlling excess reactivity of a core at the point of origin of reactivity in the fuel assembly.

According to the present invention, there is provided a nuclear reactor core which comprises a plurality of generally cylindrical fuel rods each of which comprise a cladding containing a plurality of nuclear fuel pellets stacked end to end within the cladding. Substantially all of the fuel pellets of substantially all of the fuel rods are coated with a layer comprising a refractory material interposed between the fuel pellet and the cladding to prevent direct contact between the pellet and the cladding. The layer comprises a burnable poison an isotopic composition which is adjustable in order to reduce, in a controlled fashion, any excess reactivity in the reactor core.

In another preferred aspect, the invention comprises a nuclear fuel rod which comprises a cladding tube and end plugs which are arranged to close the ends of the tube. A plurality of fuel pellets are stacked end-to-end within the cladding and between the end plugs. Substantially all of the fuel pellets are coated with a barrier layer comprising a refractory material operable to prevent contact between the pellets and the cladding. In accordance with the invention, the refractory material comprises a burnable poison isotopic composition which is operable to control any excess reactivity of the fuel pellets.

In accordance with the further aspect of the present invention, a method of controlling excess reactivity and preventing interaction between fuel pellets and fuel rod cladding in a nuclear reactor core is provided. The method comprises the steps of applying a layer of refractory material to substantially all of the fuel pellets in the core, the layer being disposed between the fuel and the cladding and being of sufficient thickness to prevent interaction between the pellets and the cladding. The layer comprises a burnable poison having an isotopic composition which is adjustable to reduce excess reactivity of the reactor core.

In accordance with a preferred embodiment of the present invention, the majority of the fuel pellets in all of the fuel rods of a reactor core are coated with zirconium boride having controlled ratios of boron-10 and boron-11. Both boron-10 and boron-11 are present in natural boron, boron-11 comprising about 80% of all natural boron. Boron-10 has a neutron capture cross section of about 3840 barns per atom whereas boron-11 has a negligible neutron capture cross section. By controlling the ratio of boron-10 and boron-11 in the zirconium boride, the level of chemical shim in reactor coolant water during startup can be minimized.

The present invention permits a reactor fuel cycle which begins with a very low chemical shim concentration, for example on the order of about 100 ppm boron. The boron concentration in a chemical shim is then increased, for example to about 500 ppm at cycle midlife and then decreased, for example to about 10 ppm at the end of life in order to balance the burnout of the fissionable materials with the burnout of the poison materials.

BRIEF DESCRIPTION OF THE DRAWINGS

The above description, as well as further objects, features and advantages of the present invention will be more fully understood by reference to the following detailed description of a presently preferred but nonetheless illustrative nuclear reactor core having fuel rods containing coated fuel pellets in accordance with the present invention when taken in conjunction with the accompanying drawings wherein.

DETAILED DESCRIPTION OF THE PRESENTLY PREFERRED EMBODIMENT

The present invention overcomes difficulties with the prior burnable poison coatings by providing a coating which is effective to prevent PCI without introducing excessive neutron absorbing isotopes into the reactor core. This is basically accomplished by adjusting the amount of neutron absorbing isotope in the coating. For example, if the coating were made of zirconium diboride, and since natural boron contains 18.4 weight percent of the absorbing isotope, boron-10, if the boron-10 in the boron were depleted by an order of magnitude to about 1.84 weight percent, it would permit coating 10 times as many pellets with the same layer thickness of boron as would have been possible if the coating were made from natural boron while introducing essentially no additional neutron absorbing material. Therefore, in accordance with the present invention all or nearly all of the fuel pellets in a reactor core can be coated with zirconium diboride of sufficient thickness to prevent PCI. Once it is determined how thick a pellet coating will be and how much absorbing isotope (boron-10) is needed to almost, but not quite, counteract all of the initial excess reactivity in the core, the only remaining varible is the weight percentage of boron-10 in the boron used to make the zirconium diboride. As detailed below, this number can be readily calculated.

Figure 1:
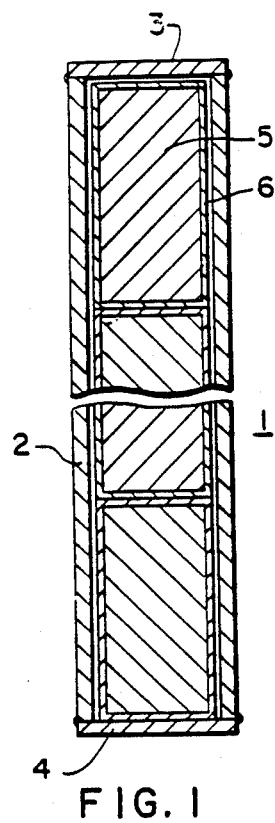
FIG. 1 is a longitudinal cross sectional view of a typical fuel rod.
Figure 2:
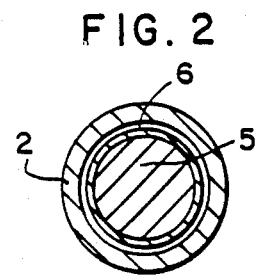
FIG. 2 is a cross sectional view of the annular burnable absorber rod taken along line 2—2 of FIG. 1.

Turning now to FIGS. 1 and 2, there is illustrated a longitudinal cross section and a transverse cross section respectively of a typical fuel rod according to the present invention. The figures are schematic and not to scale. In FIGS. 1 and 2 like numerals refer to like components. A typical fuel rod 1 might be one-quarter to one inch in diameter and 8–15 feet long. A tube or cladding, typically about 20–40 mils thick, is represented by numeral 2. End closures or plugs, which may be of many shapes and sizes to facilitate handling, are represented by numerals 3 and 4 respectively. Coating fuel pellets, which usually comprise uranium dioxide or uranium plutonium dioxide, are represented by the numeral 5. The pellets 5 are preferably cylindrical and slightly smaller in diameter than the inside diameter of the cladding 2 in order to facilitate insertion of the pellets in the cladding. For ease of manufacturing and handling, the pellets 5 may be made with a length-to-diameter ratio of about 1.5. A boride coating, preferably zirconium diboride, is represented by the numeral 6.

Figure 3:
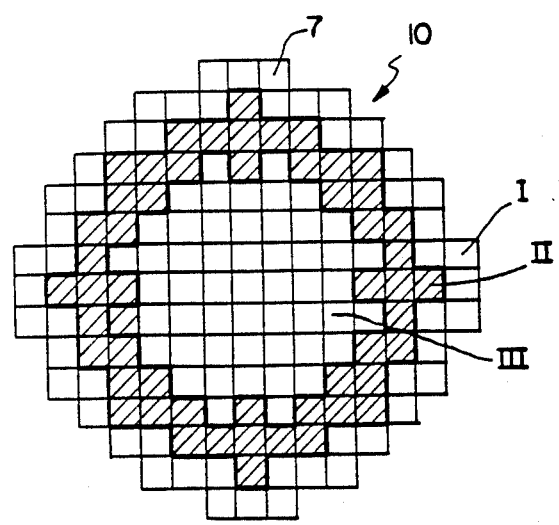
FIG. 3 is a schematic illustration of a reactor core taken in cross section.

As illustrated in FIG. 3, from about 40–300 fuel rods of the type described above are collected and supported in a rectangular array to produce a fuel assembly 7. From about 40 to about 200 fuel assemblies may be collected and arranged in a generally cylindrical array to form a typical reactor core 10.

Referring again to FIGS. 1 and 2, the coating 6 is disposed between the fuel 5 and the cladding 2 as a coating on the fuel. This prevents the cladding 2 from coming into direct contact with the fuel 5 thereby preventing PCI by preventing pellet clad contact. As alluded to above, the phenomena of PCI is believed to cause defects in fuel rod cladding during reactor operation which can be mitigated or eliminated by a layer of sufficient thickness to prevent such contact. It is generally considered that separating the fuel and cladding by a distance of about on the order of 10–100 microns (0.4 to 4 mils) is sufficient to mitigate or prevent the undesirable effects of PCI. The economical use of space and materials tends to provide an upper limit to the use of very thick layers between the fuel and the cladding.

If a coating 6 is to function as a layer between the fuel and cladding to prevent the effects of PCI, it must be present in all of nearly all of the pellets in the core. As alluded to above, a typical large reactor might contain on the order of about 50,000 fuel rods each containing about 280 fuel pellets or roughly 14,000,000 pellets. If each of these pellets is coated with a zirconium diboride layer of only 10 microns thick and if the boron used to make the diboride is natural boron containing 18.4 weight percent boron-10, the reactor core would contain about 56,000 grams of boron. This is on the order of 3 to 5 times the amount needed to counteract the excess reactivity, k, of a fresh core.

The present invention allows the use of zirconium diboride and other borides as a combination coating on the fuel pellets to provide the functions of PCI resistance and burnable poison by tailoring the isotopic content of the boron used to fit the needs of both functions. By tailoring the amount of boron-10 in the boron used to create the boride layer 6 it is possible to achieve PCI protection while effectively introducing the desired level of burnable poison in a reactor core or portion of a reactor core to effectively control the excess reactivity.

Using boron-10 depletion or enrichment as a variable, many options for core design and for fuel pellet coating are now available. The following examples are illustrative, but not exhaustive, of possible coatings:

EXAMPLE 1

Consider a reactor core containing 14,000,000 fuel pellets with a fuel enrichment that requires a total of 4500 grams of boron-10 to control its reactivity at startup. For PCI resistance, each pellet is provided with a 25 micron thick coating of zirconium diboride. Each pellet therefore requires 9.8 milligrams of boron, but only 0.32 milligrams of boron-10. Therefore, the boron used to make the fuel pellet coating will advantageously contain only 3.3 weight percent or 3.6 atom percent of the isotope boron-10.

EXAMPLE 2

If the same 14,000,000 fuel pellets are coated uniformly with 4500 grams of boron-10, but the zirconium diboride layer is only 10 microns thick, each pellet requires 3.9 milligrams of boron and 0.32 milligrams of boron 10. The boron used to make the zirconium diboride coatings on the pellets should therefore contain 8.2 weight percent or 9.0 atom percent of the isotope boron-10.

EXAMPLE 3

Consider a reactor core containing 14,000,000 fuel pellets divided into three regions I, II, and III (see FIG. 3), where one region or batch is highly enriched compared to the other two but where the pellets in all three regions are coated with a 10 micron thick layer of zirconium diboride. The core life is such that a total of 4500 grams of boron-10 are required for the entire core. A 10 micron thick coating of zirconium diboride can be applied to the approximately 4,700,000 pellets which make up the most highly enriched batch using natural boron containing 18.4 weight percent boron-10. These pellets would carry 3370 grams of boron-10 into the core leaving 1130 grams of boron-10 to be supplied by the remaining 9,300,000 pellets. The latter pellets require 3.9 milligrams of boron per pellet containing 0.12 milligrams of boron-10. The boron to make the coatings on these pellets would contain 3.1 weight percent or 3.4 atom percent boron-10.

EXAMPLE 4

For a reactor core containing 50,000 fuel rods and requiring 4500 grams of boron-10 evenly distributed in zirconium diboride coatings on the pellets, each rod should contain about 0.09 gram of boron-10. This is only 0.009 gram molecular weight of boron-10 which produces the same number of moles of helium gas when the boron-10 absorbs a neutron. This is about 202 cubic centimeters of helium at standard conditions of temperature and pressure. Since the void volume in a typical fuel rod is on the order of about 20 cubic centimeters, the gas pressure due to this helium is on the order of about 10 atmospheres or about 150 psia at room temperature. Since helium is a good conductor (among gases) and since reactor operating pressures are on the order of about 1000 to 2200 psia, most fuel rods are initially pressurized with helium at pressures ranging from about 100 to about 450 psia to partially offset the reactor operating pressure. This internal pressure provides a good heat transfer from the fuel to the cladding and retards cladding creep down onto the fuel thereby delaying pellet clad contact and PCI. With the present invention, the 150 psia of helium pressure released by the boride coating may be taken into account for reducing the initial fuel rod pressurization by a proportional amount.

The advantage of controlling the amount of helium gas released by the boron-10 in the fuel rod can best be realized by considering the following example:

EXAMPLE 5

For a core design requiring about 3400 grams of boron-10 distributed amount about 5,000,000 pellets in about 17,000 fuel rods, each rod would contain about the 0.20 gram of boron-10. This amount of boron-10 would produce 450 cubic centimeters of helium gas per fuel rod in a fuel rod having about 20 cubic centimeters of void space and would result in a gas pressure of about 330 psia at room temperature. If this gas release and concomitant pressure is taken into account in fuel rod design, the initial pressurization can be reduced. Since gases are also released by the fuel itself and since it is not desirable for the internal pressure of a fuel rod to exceed the external pressure thereof at operating temperatures, no more than about 0.20 gram of boron-10 should belong in a single fuel rod having 20 cubic centimeters of void volume. By the present invention, the pressure of the helium gas can be accurately controlled and accounted for by allowing the boron-10 to be distributed uniformly among substantially all the rods in a reactor core.

The uniform distribution of boron-10 among substantially all the rods in a reactor core permits more boron-10 to be added to the core to control excess reactivity at the beginning of a cycle. This in turn allows more excess reactivity to be added to the fuel to increase the life of the core and thus the length of a reactor cycle. In contradistinction, in reactors using only chemical shim reactivity control, reactivity is maintained by diluting the chemical shim as a function of time in the manner illustrated in FIG. 3.

Figure 4:
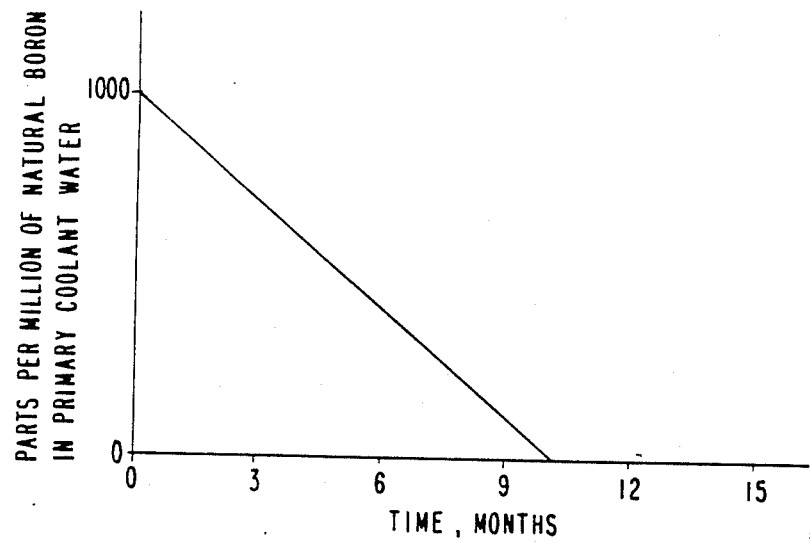
FIG. 4 is a graph illustrating boron concentration in reactor coolant as a function of time when using chemical shim with prior art fuel assemblies.
Figure 5:
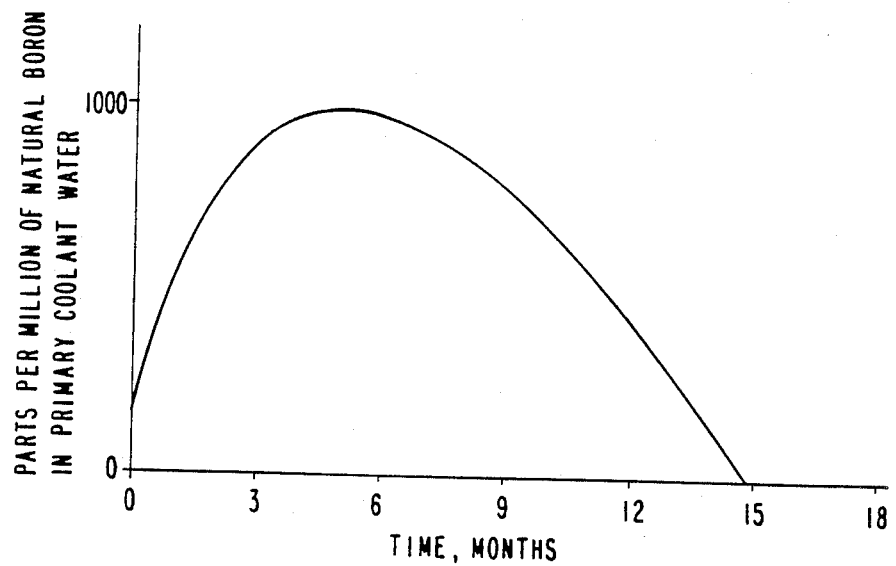
FIG. 5 is a graph illustrating boron concentration in reactor coolant as a function of time using the present invention.

In accordance with the present invention, initial excess reactivity of the core is largely controlled by the boron-10 in the boride coatings on the fuel pellets in the fuel rods and where chemical shim is used in addition, the boron content of the chemical shim is at or near the minimum required to assure a margin of excess reactivity. As the boron-10 in the fuel rods depletes over a period of about 4 to 10 months, boron is added to the chemical shim in the manner illustrated in FIG. 4 thus assuring proper control of excess reactivity at all times.

As detailed above, the coating 6 preferably comprises a boride. Borides in general are hard refractory compounds having a black metallic luster which are brittle and should be handled like ceramics. Advantageously, borides in a coating 6 are formed by reaction of the elemental materials although this is not essential.

Boride coatings on material such as nuclear fuels or other metals and ceramics are readily applied by sintering compacts of the powdered boride to compacts of the powdered substrate material, or by mixing the boride with a low melting glaze and applying the mixture in the form of a frit to an object and sintering the mixture, or by plasma spraying the molten powder onto the object to be coated. These techniques are well known to those skilled in the art of ceramics. For applying thin coatings on fuel pellets, plasma spraying molten boride on the pellets is the technique preferred.

The boride coatings 6 may also be applied by electroplating from salt baths. Where this method is used, the fuel pellet should be pre-coated with a very thin conductive layer and a boride coating electroplated over the thin conductive layer.

Alternatively, the boride coating 6 may be applied by chemical vapor deposition. Because some chemicals used in conventional vapor deposition processes for the deposition of borides tend to react with oxide nuclear fuels, it is usually necessary to pre-coat the oxide fuel with an unreactive coating such as niobium metal as discussed in commonly assigned copending application Ser. No. 468,743 filed Feb. 22, 1983.

The boride coating may also be applied by a technique variously known as ion sputtering, vapor plating, or vacuum metallization. This technique requires heating the coating material, for example zirconium diboride, to vaporize small amounts at a controlled rate into a vacuum chamber. The coating material may be heated by an electrical heater, an electric arc or an ion or electron gun. The object to be coated is maintained relatively cold in the vacuum chamber so that the coating material vapors condense onto it to form a coating. Since the coatings are deposited molecule by molecule from a vapor, the formation of thick coatings is relatively time consuming. However, this process has distinct advantages in that no pre-coating is necessary and the coating material need not be very dense nor accurately shaped and that the applied coating can be accurately controlled with respect to thickness.

As should now be apparent, the present invention produces a fuel rod that is resistant to damage by PCI since it permits many or all of the fuel pellets in the reactor core to be coated. In addition, it produces a fuel rod that contains less boron-10 than the prior art rods and so generates less helium and lithium. This is important since excess internal pressure can adversely affect fuel rod lifetime. Moreover, the present invention controls excess reactivity in the core at the point of origin i.e. at the fuel so that excess reactivity can be controlled more effectively, more evenly, and without the use of large amounts of other types of reactivity control. This results in more efficient use of neutrons and fuel, and where chemical shim is used, greatly reduces the volume of chemical shim water which must be treated for recovery during each reactor cycle.

Although the invention herein has been described with reference to particular embodiments, it is to be understood that these embodiments are merely illustrative of the principles and applications of the present invention. It is understood that numerous modifications may be made in the illustrative embodiments and that other arrangements may be devised without departing from the spirit and the scope of the present invention as defined by the appended claims.

I claim:

1. A nuclear reactor core comprising a plurality of generally cylindrical fuel rods, each of said fuel rods comprising a cladding containing a plurality of nuclear fuel pellets stacked end-to-end within said cladding, wherein substantially each fuel pellet of substantially all of the fuel rods is coated with a layer of a refractory material interposed between the fuel pellet and the cladding of sufficient thickness to effectively prevent direct contact between the pellet and the cladding, said layer comprising a burnable poison having a non-naturally occurring tailored isotopic composition adjusted to reduce, in a controlled fashion, initial excess reactivity in said reactor core.

2. The reactor core of claim 1 wherein said burnable poison comprises a boride.

3. The reactor core of claim 2 wherein said boride comprises zirconium diboride.

4. The reactor core of claim 3 wherein said boride contains boron which is depleted in isotope boron-10 with respect to natural boron.

5. The reactor core of claim 2 wherein said layer is on the order of 10-100 microns thick.

6. A nuclear fuel rod comprising a cladding tube having ends and end plugs arranged to close said ends, a plurality of fuel pellets stacked end-to-end within said cladding tube between said end plugs, substantially all of said fuel pellets being coated with a barrier layer comprising a refractory material of sufficient thickness to effectively prevent interaction between said pellets and said cladding tube, said refractory material comprising a burnable poison having a tailored, non-naturally occurring isotopic composition determined on the basis of said thickness.

7. The fuel rod of claim 6 wherein said isotopic composition comprises a boride containing boron-10 and boron-11 in controlled ratios.

8. The fuel rod of claim 7 wherein said boride comprises zirconium diboride.

9. The fuel rod of claim 7 wherein said boride is depleted in boron-10 with respect to natural boron.

10. The fuel rod of claim 6 wherein said layer is on the order of about 10-100 microns thick.

11. A method of controlling excess reactivity and preventing interaction between fuel pellets and fuel rod cladding in a nuclear reactor core having an initial excess reactivity comprising the steps of:
providing a predetermined amount of a burnable poison having a naturally occurring isotopic composition;
tailoring said isotopic composition from said naturally occurring isotopic composition to effectively counteract said initial excess reactivity; and
applying a layer of refractory material to substantially all of said fuel pellets, wherein said layer comprises said predetermined amount of burnable poison and is disposed between the fuel pellets and the cladding, said layer being of sufficient thickness to effectively prevent interaction between said pellets and said cladding.

12. The method of claim 11 further comprising the steps of:
operating said reactor core to burn at least some of said burnable poison; and
supplying additional neutron absorbing material to said core to control excess reactivity.

13. The method of claim 12 wherein said reactor is cooled by a flowing coolant and the step of supplying additional neutron absorbing material comprises supplying a chemical shim to said coolant after said burnable poison in said layer has been at least partially depleted.

14. The method of claim 11 wherein said burnable poison comprises a boride having a boron isotopic composition, and said step of controlling comprises either enriching or depleting an isotope boron-10 in said boride with respect to natural boron in at least some of said rods.

15. A method of controlling excess reactivity of a nuclear reactor core having an overall initial enrichment which creates an initial excess reactivity while preventing interaction between fuel pellets and fuel rod cladding in said core, comprising the steps of:
determining an amount of burnable poison required to control said initial excess reactivity;
determining, based on a predetermined thickness of fuel pellet coating effective for preventing said interaction and said amount of burnable poison required, an isotopic composition of said burnable poison;
coating substantially all of the fuel pellets in said core with a layer of a refractory material of said predetermined thickness, said refractory material comprising said amount of burnable poison having said determined isotopic composition.

16. The method of claim 15 wherein said reactor core is uniformly enriched and said layer has a uniform isotopic composition.

17. The method of claim 15 wherein said reactor comprises at least two regions, each of said regions being characterized by a different initial enrichment, wherein said step of determining said isotopic composition further comprises determining said isotopic composition of the coatings for each of said regions based on said different initial enrichments.

18. The method of claim 15 wherein said fuel rods have a characteristic void space and wherein said fuel rods are initially pressurized, said method further comprising the step of adjusting said initial pressurization based on an amount of gas pressure released into said void space by said burnable poison during reactor operation.

19. The method of claim 15 wherein said predetermined thickness is between about 10 microns and 100 microns.

20. A nuclear reactor core comprising a plurality of generally cylindrical fuel rods, each of said fuel rods comprising a cladding containing a plurality of nuclear fuel pellets stacked end-to-end within said cladding, wherein substantially each fuel pellet of substantially all of the fuel rods is coated with a layer of a refractory material interposed between the fuel pellet and the cladding of sufficient thickness to effectively prevent direct contact between the pellet and the cladding, said layer comprising a burnable, boride poison having an isotopic composition adjusted to reduce excess reactivity in said reactor core; wherein a first portion of said plurality of fuel rods contain fuel pellets coated with zirconium diboride having natural boron and a second portion of said plurality of fuel rods contain fuel pellets coated with zirconium diboride depleted in isotope boron-10.

21. A nuclear reactor core comprising a plurality of generally cylindrical fuel rods, each of said fuel rods comprising a cladding containing a plurality of nuclear fuel pellets stacked end-to-end within said cladding, wherein substantially each fuel pellet of substantially all of the fuel rods is coated with a layer of a refractory material interposed between the fuel pellet and the cladding of sufficient thickness to effectively prevent direct contact between the pellet and the cladding, said layer comprising a burnable poison having an isotopic composition adjusted to reduce excess reactivity in said reactor core, and wherein said core is divided into a plurality of regions, each of said regions being characterized by fuel rods having fuel pellets of a different enrichment, wherein said poison isotopic composition is adjusted in accordance with the enrichment of each of said regions.

22. A method of controlling excess reactivity and preventing interaction between fuel pellets and fuel rod cladding in a nuclear reactor core having an initial excess reactivity comprising the steps of:
providing a predetermined amount of a burnable poison having an isotopic composition;
controlling said isotopic composition to effectively counteract said initial excess reactivity;
applying a layer of refractory material to substantially all of said fuel pellets, wherein said layer comprises said predetermined amount of burnable poison and is disposed between the fuel pellets and the cladding, said layer being of sufficient thickness to effectively prevent interaction between said pellets and said cladding; and
wherein said reactor core is divided into a plurality of regions distinguished by an enrichment value of nuclear fuel in said fuel pellets, and wherein said step of controlling further comprises adjusting the isotopic composition of said layer in accordance with the enrichment in each of said regions.

* * * * *